US005410941A

United States Patent [19]

Hotta et al.

[11] Patent Number: 5,410,941

[45] Date of Patent: May 2, 1995

[54] ELECTRONIC MUSICAL INSTRUMENT HAVING AN EXTERNAL MEMORY DEVICE

[75] Inventors: Harumichi Hotta; Akira Suzuki; Akira Tozuka, all of Hamamatsu, Japan

[73] Assignee: Yamaha Corporation, Japan

[21] Appl. No.: 301,721

[22] Filed: Sep. 7, 1994

Related U.S. Application Data

[63] Continuation of Ser. No. 820,531, Jan. 14, 1992, abandoned.

[30] Foreign Application Priority Data

Jan. 17, 1991 [JP] Japan .................................. 3-17144

[51] Int. Cl.⁶ ........................ G09B 15/04; G10H 1/18

[52] U.S. Cl. ........................................ 84/601; 84/602; 84/641; 84/477 R

[58] Field of Search .................................. 84/601-646, 84/DIG. 29, 477 R, 478

[56] References Cited

U.S. PATENT DOCUMENTS

| | | | |
|---|---|---|---|
| 4,512,230 | 4/1985 | Ezawa et al. | 84/626 |
| 4,624,171 | 11/1986 | Yuzawa . | |
| 4,922,794 | 5/1990 | Shibukawa | 84/601 |
| 4,960,030 | 10/1990 | Fujimori . | |
| 5,074,183 | 12/1991 | Chihana | 84/622 X |

*Primary Examiner*—Stanley J. Witkowski
*Attorney, Agent, or Firm*—Graham & James

[57] ABSTRACT

An external memory medium storing data corresponding to a desired automatically playing or tone color selecting function can be removably set, so as to expand various functions of an electronic musical instrument. An identification code is recorded in the medium, and thus the function of the medium can be automatically determined from the code. The instrument is automatically set to an operation mode corresponding to the function in accordance with the determined function so that the data stored in the medium can be utilized. The determined function may be displayed to the player.

17 Claims, 3 Drawing Sheets

ELECTRONIC MUSICAL INSTRUMENT HAVING AN EXTERNAL MEMORY DEVICE

This is a continuation of application Ser. No. 07/820,531 filed on Jan. 14, 1992, and now abandoned.

BACKGROUND OF THE INVENTION

This invention generally relates to an electronic musical instrument, and more particularly to an electronic musical instrument which, in response to the insertion thereinto of an external memory medium providing an extra function such as automatic playing function or tone color selecting function, can automatically set an operation mode to realize a specific function of the inserted external memory medium and thus allows a music performance to be performed by the external memory medium in simple and efficient manner.

There is known an electronic musical instrument which allows insertion of an external memory medium such as a floppy disk, memory card etc. in which, for example, plural kinds of automatic performance data or tone color data are stored for being selectively read out (an external memory medium storing automatic performance data will hereafter be referred to as an automatically playing medium, and an external memory medium storing atone color data will hereafter be referred to as a tone color selecting medium), and which is capable of realizing the extra function of the inserted medium to expand its functions beyond those programmed in its internal memory. U.S. Pat. No. 4,624,171, for example, shows selectively using a memory pack or a magnetic tape as an external memory medium and effecting a change of the media by mannual selection through a switch operation. Further, U.S. Pat. No. 4,960,030 shows the use of a floppy disk as an external memory medium.

The user inserts either of the automatically playing medium and tone color selecting medium and manually operates operation mode setting switches on an operating panel in accordance with the function (automatically playing function or tone color selecting function) of the inserted medium. In response to such operation, the electronic musical instrument is set to an operation mode for realizing the function of the inserted medium and also makes a display of automatic performance selecting information to be used for selecting a desired type of an automatic performance or a display of tone color selecting information for selecting a desired type of a tone color. Then, based on the displayed information, the user performs necessary switch operations on the operating panel, to select the desired type of the automatic performance or tone color.

However, with the prior art instrument of this type, each time an external memory medium for expanding function is inserted, it is necessary to perform manual operations for setting an operation mode corresponding to the function of the inserted medium. Such manual operations are quite bothersome. Further, in the event that the external memory medium is inserted without its function being confirmed because there is no indication of the function on the medium, it is not possible to set a proper operation mode, without temporarily operating a operation mode setting switch to see an reaction (for example, a display of "switch error" of the instrument. Thus, with such prior musical instrument, a music performance can not performed by the external memory medium in simple and efficient manner.

SUMMARY OF THE INVENTION

It is therefore an object of the present invention to provide an electronic musical instrument which allows an external memory medium to be utilized in simple and efficient manner.

To achieve the above-mentioned object, an electronic musical instrument according to the invention comprises: a reading section capable of having an external memory medium removably set therein for reading out data stored in the medium, the medium storing data corresponding to predetermined one function of plural different functions; a medium function determining section for determining which one of the plural different functions the data of the external memory medium corresponds to, and an operation mode setting section for automatically setting an operation mode for using the external memory medium in accordance with the function determined by said medium function determining section so that the data read out by said reading section can be utilized in accordance the operation mode set thereby.

The external memory medium provides the electronic musical instrument with an extra function such as an expanded automatically playing function or tone controlling function. Namely, if it is desired to realize an automatically playing function or tone. controlling function that is not prestored or programmed in the instrument, an external memory medium storing data corresponding to the desired function is inserted and set in the instrument. In response to this setting of the medium, the medium function determining section determines which of plural different automatically playing and tone controlling functions the data of the set medium corresponds to. This determination may be done such as by reading an identification code recorded in the head or leading portion of the medium, or by recognizing other information provided in the medium by other means. The instrument is set to an operation mode suitable for utilizing the medium in accordance with the determined function. Thus, data read out by the reading section can be utilized in accordance with the operation mode.

In this manner, according to the present invention, an operation mode is automatically established in correspondence with the function of the medium, so that it is not necessary to perform manual operations for setting an operation mode. As the result, a simple and efficient performance can be achieved by the medium.

Further, in the present invention, a display section mar be provided for making a predetermined display which may correspond to the function determined by the medium function determining section or which may show the operation mode set. With such display, it is made possible to instantly confirm whether or not the medium set in the instrument is of a desired function even in the case where the medium is set without its function being confirmed beforehand.

Now, preferred embodiments of the invention will be described with reference to the accompanying drawings.

DETAILED DESCRIPTION OF THE PREFERRED EMBODIMENTS

Figure 1:
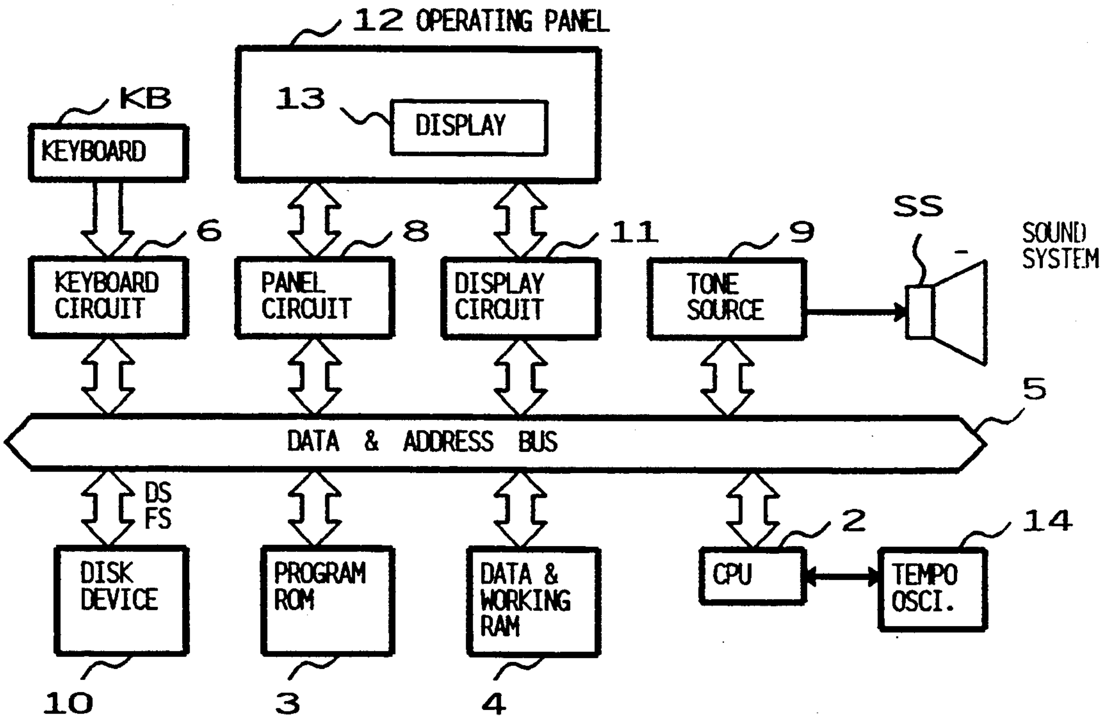
FIG. 1 is a block diagram showing a general structure of an electronic musical instrument according to an embodiment of the present invention.

FIG. 1 is a block diagram showing a general construction of an electronic musical instrument according to an embodiment of the present invention. In this embodiment , overall controls of the electronic musical instrument are executed by a microcomputer which includes a central processing unit (CPU) 2, a program ROM 3 and a data and working RAM 4. To the microcomputer are connected a keyboard circuit 6, a pane 1 circuit 8, a tone source unit 9, a disk device 10 and a display circuit 11 via a data and address bus 5.

The keyboard circuit 6 includes plural key switches which are provided in corresponding relation to plural keys on a keyboard KB, and the circuit 6 serves to detect a depressed key and outputs various data such as a key code indicative of the depressed key.

The panel circuit 8 is provided in corresponding relation to plural operators such as various switches which are provided on an operating panel 12, and the circuit 8 serves to output various panel operation data corresponding to operation of the individual operators.

The tone source circuit 9 is capable of generating a tone signal in each of plural tone signal generating channels on the basis of various data including a key code, key-on signal, panel operation data that are input thereunto through the data and address bus 5. Tone signal generated in the tone source unit 9 are converted into analogue form by a digital-to-analgue converter (not shown) and thereafter are acoustically sounded through a sound system SS including a speaker.

The disk device 10 receives there in either of an automatic playing disk and a tone color selecting disk for allowing expansion of the functions of this electronic musical instrument. In the front end or head portion of the automatic playing disk, an identification code is recorded to indicate that it is an automatic playing disk. Likewise, in the front end portion of the tone color selecting disk, an identification code is recorded to indicate that it is a tone color selecting disk. In the case of any other type of memory medium storing therein data corresponding to other playing functions or tone controlling functions, an identification code corresponding to such function is recorded in the medium. The disk device 10 detects the insertion thereunto of the disk and reads the identification of the disk to output a insertion detection signal DS as well as a disk function detection signal.

The display circuit 11 is provided in corresponding relation to a display 13 which is incorporated in the operating panel 12 and which comprises for example a LCD (liquid crystal display). When the automatic playing disk or tone color selecting disk is inserted into the disk device 10, the display circuit 11 causes a display on the display 13 of automatic performance selection information to be utilized for selecting a type of automatic performance, or of tone color selection information to be utilized for selecting a type of a tone color.

A tempo oscillator 14, which is provided for generating tempo clock pulses for automatic playing, for example serves to establish a timing in accordance with which the CPU 2 reads out automatic performance data recorded in the automatic playing disk, that is, an automatic performance tempo.

Further, in a predetermined area of the data and working RAM 4, the following registers are provided:

- disk flag DISKIN which stores "1" when either of the automatic playing disk and tone color selecting disk is inserted in the disk device 10:
- automatic performance flag AUTO which stores "1" when the automatic playing disk is inserted in the disk device 10, and
- tone color selection flag REGIST which stores "1" when the tone color selecting disk is inserted in the disk device 10.

Figure 2:
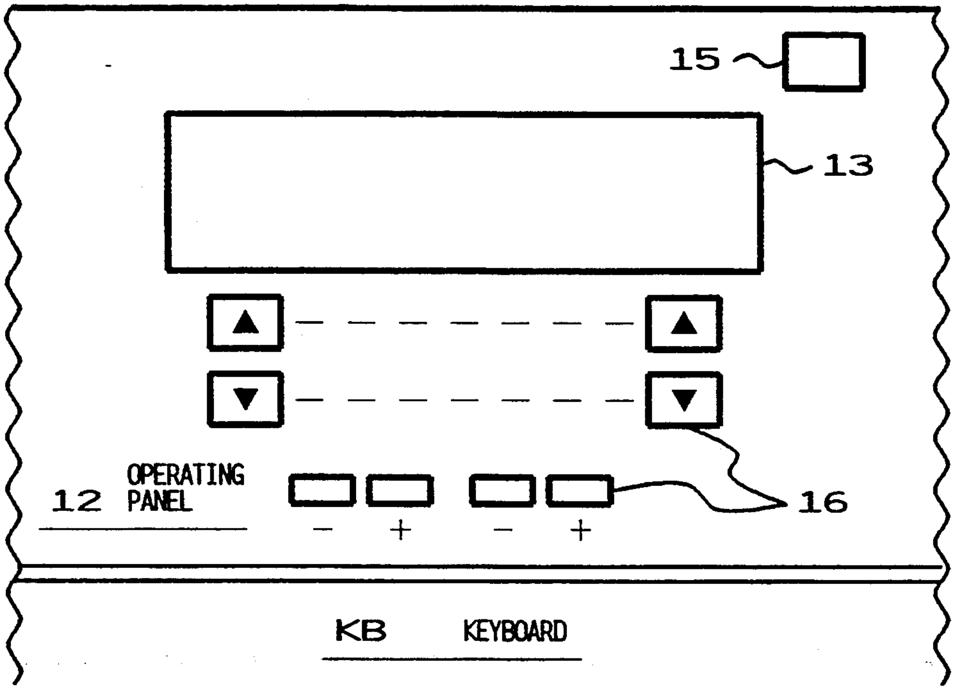
FIG. 2 is schematic plan view showing a playing and operating sect ion of the embodiment.

FIG. 2 illustrates a playing and operating section of the electronic musical instrument which comprises the keyboard KB and operating panel 12. An action or operation mode setting switch 15 is provided for, if necessary, manually setting an operation mode that corresponds to the function of the disk inserted in the dish device 10. Further, a plurality of selecting switches located adjacent the display 13 are provided for selecting a desired type of automatic performance based on the automatic performance information which is displayed on the display 13 when an automatic performance mode is established as will be described later, or for selecting a desired type of a tone color when a tone color selection mode is established.

Figure 3:
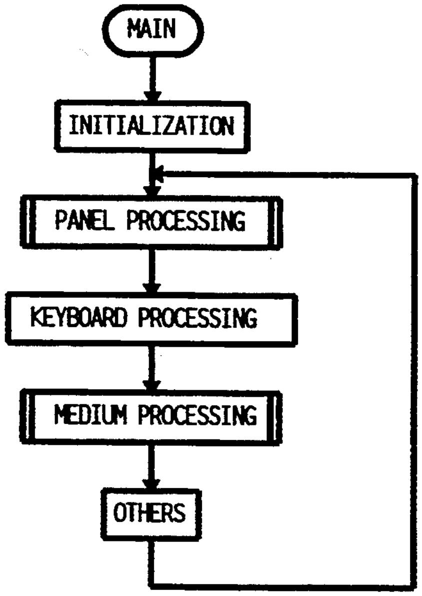
FIG. 3 is a flowchart of an example of a main routine carried out by a CPU shown in FIG. 1.
Figure 4:
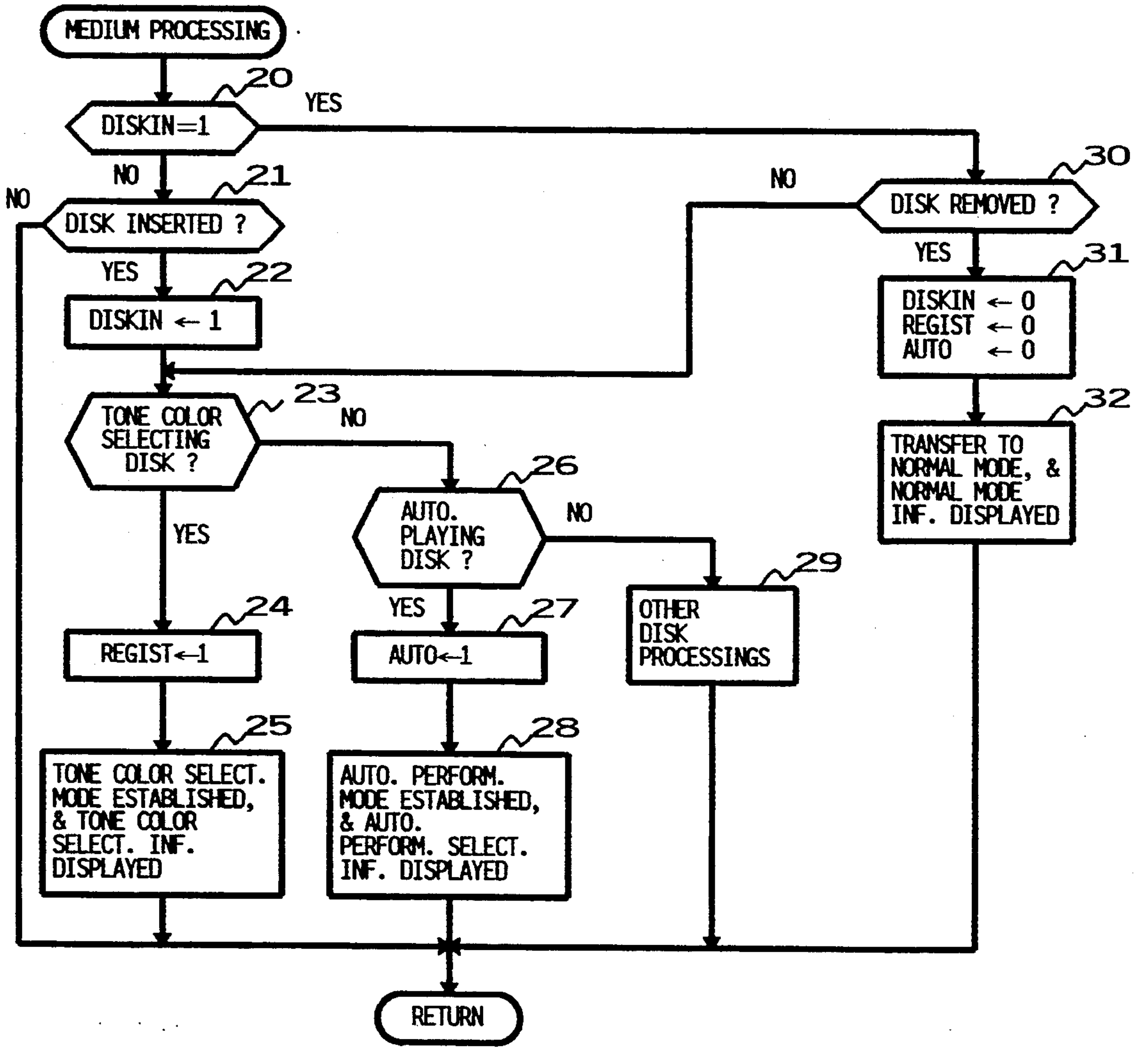
FIG. 4 is a flowchart of an example of an external medium processing carried out by the CPU.
Figure 5:
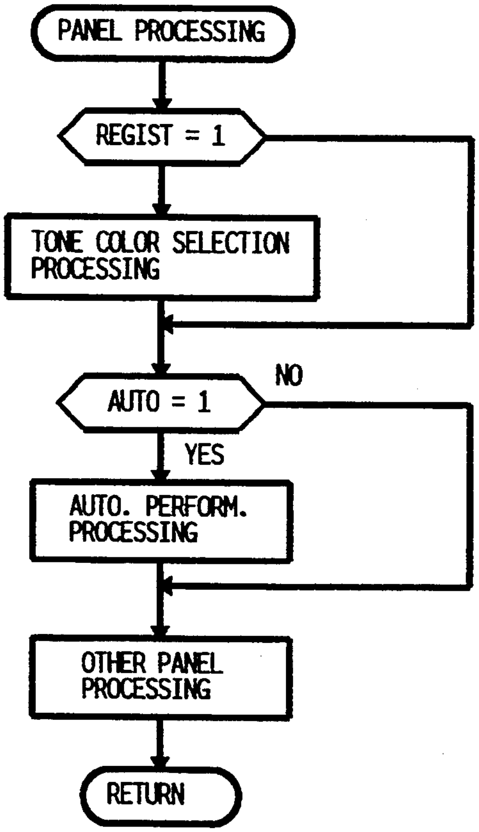
FIG. 5 is a flowchart an example of a panel processing carried out by the CPU.

Now, examples of various processes carried out by the CPU 2 will be described on the basis of flowcharts as shown in FIGS. 3 to 5.

In a main routine of FIG. 3, following a predetermined initialization, a routine comprising a panel processing, a keyboard processing, an external medium processing and other processing is carried out in a repeated manner. In the panel processing, various operators of the operating panel 12 are scanned to detect their ON/OFF states etc., and various processings are executed on the basis of such detection. In the keyboard processing, ON/OFF states of the individual key switches are detected, so that a predetermined key-on event processing is executed if there is a key-on event and a predetermined key-off event processing is executed if there is a key-off event.

FIG. 4 specifically shows the external medium processing, in which it is first examined whether or not the disk flag DISKIN indicates "1" (step 20) . If the examination result in step 20 is NO, it is meant that neither of the automatic playing disk and tone color selecting disk is currently inserted in the disk device 10, and thus the flow advances to step 21. In step 21, it is examined on the basis of the presence or absence of the insertion detection signal DS whether or not any disc has been inserted into the disk device 10. If the result is YES, the disk flag DISKIN is set to "1" (step 22).

In steps 23 and 26, the function of the inserted disk is determined. That is, in step 23, it is determined whether or not the inserted disk is a tone color selecting disk. If the result is YES in step 23, the tone color selection flag REGIST is set to "1" (step 24). and the the tone color selection mode is established and tone color selection information shown on the display 13 (step 25).

If in step 23, the result is NO, that is, it is determined that the inserted disk is not a tone color selecting disk, it is further determined in step 26 whether or not the inserted disk is an automatic playing disk. If the result is YES in step 26, the automatic performance flag AUTO is set to "1" (step 27), and then the automatic performance mode is established and automatic performance selection information is shown on the display 13 (step 28). If in step 26, the result is NO. that is, it is determined that the inserted disk is not an automatic playing disk, another disk processing is performed to, for example, display "disk error" indicating that an unacceptable disk other than a tone color selecting disk and an automatic playing disk has been inserted into the disk device (step 29).

If in step 20, the result is YES that is, it is determined that the disk flag DISKIN currently shows "1", it is meant that a certain disk is being inserted in the disk device 10, and thus it is further determined whether or not the disk has been removed from the disk device 10 (step 30). If the result is YES in step 30, each of the disk flag DISKIN, automatic performance flag AUTO and tone color flag REGIST is set to "1" (step 31). Then the operation mode is transferred to the normal mode which does not require or rely on any external memory medium designed for expanding the functions of the electronic musical instrument, and normal mode information is shown on the display 13 to indicate various operational states currently set in the normal mode (step 32). Such normal mode information includes for example a tone color that is currently selected from among various tone colors prestored in the program ROM 3 of the electronic musical instrument.

If in step 30, the result is NO meaning that the disk has not yet been removed from the disk device 10, then the above-mentioned step 23 and other steps subsequent thereto are executed.

FIG. 5 specifically shows the panel processing carried out by the CPU 2. It is first determined whether or not the tone color selection register REGIST shows "1". If the determination result is YES, a predetermined tone color selection processing is executed. Next, it is determined whether or not the automatic performance flag AUTO shows "1". If the determination result is YES, a predetermined automatic performance processing is executed, and other panel processings are executed as may be necessary.

Next, an example operation of the electronic musical instrument according to the embodiment will be described.

Figure 6:
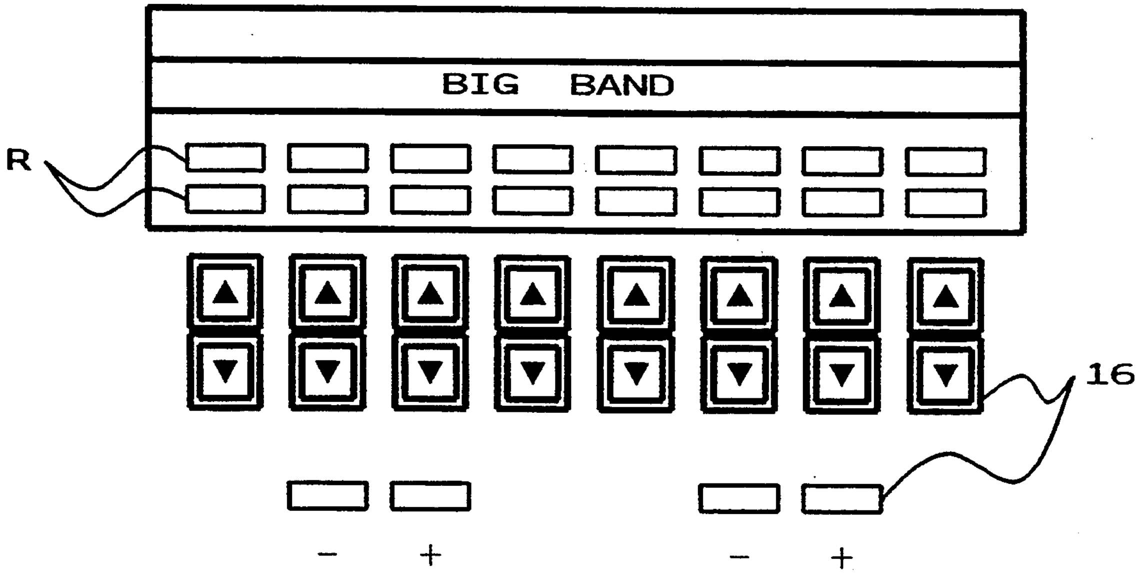
FIG. 6 is a diagram illustrating an example of tone color selection information displayed on the musical instrument.

First, description will be made on how the electronic musical instrument operates when the tone color of a tone produced by the electronic musical instrument is to be changed to one of those stored in a tone color selecting disk. A desired one of plural tone color selecting disks is first selected and inserted into the disk device 10. It is to be noted that the plural tone color selecting disks have different tone color selection data stored therein, but each of them has the same identification code indicating that it is a tone color selecting disk. The disk device 10 then outputs a disk insertion detection signal DS and also outputs a disk function identification signal FS upon reading the identification code of the disk. In response to this, processes of steps 20 to 25 in FIG. 4 are executed for automatically establishing the operation mode of the musical instrument at the tone color selection mode, and for showing tone color selection information on the display. FIG. 6 illustrates an example of the tone color selection information as shown on the display 13. In the illustrated tone color selection information, "BIG BAND" indicates the contents (the name of a tone color group) of tone color selection data stored in the disk. On a lower display area (denoted by block R in the figure) below the contents-indicating area, names of selectable tone colors are displayed. The user operates the selecting switches 12 of the panel 12 while making reference to the displayed tone color names, so as to select a desired tone color name. The tone color of a tone signal to be generated by the tone source circuit 9 is controlled in correspondence with the selected tone color.

If it is desired to perform an automatic performance as recorded in the automatically playing disk, the disk is inserted and set in the disk device 10. The disk 10 outputs a disk insertion detection signal DS and a disk function determination signal FS by reading the identification code of the disk. In response to such signals DS, FS, the instrument is automatically set to the automatic performance mode, and automatic performance selection information (not shown) listing, for example, plural automatically playing music pieces is displayed. Thus, the user can operates the selecting switches 16 of the panel 16 while making reference to the displayed information, so as to select therefrom a name of a desired automatically playing music piece.

Although in the foregoing embodiment, a floppy disk is used as an external memory medium, this invention may be applied to an electronic musical instrument in which other types of external memory medium such as a memory IC. Further, the external memory medium may be of other function than automatically playing or tone color selecting function.

As described so far, according to the present invent ion, each time an external memory medium is set, an operation mode to realize the function of the external memory medium is automatically established. With this arrangement, a performance by the external memory medium can be performed in simple and efficient manner.

What is claimed is:

1. An electronic musical instrument operable in plural operation modes each corresponding to respective data stored in plural external memory media, comprising:
   - reading means capable of having one external memory medium removably attached thereto, said reading means for reading out data stored in the memory medium;
   - operation mode determining means for determining an operation mode from among said plural operation modes based on the data read out from said attached memory medium; and
   - operation mode setting means for automatically setting said determined operation mode so that the data read out by said reading means can be utilized under said determined operation mode.

2. An electronic musical instrument as defined in claim 1, in which each said external memory medium has operation mode information representing the operation mode corresponding thereto, and said operation mode determining means determines the operation mode based on the operation mode information.

3. An electronic musical instrument as defined in claim 2, in which each said external memory medium has the operation mode information as part of the data stored therein.

4. An electronic musical instrument as defined in claim 3, in which said operation mode information is stored in a leading portion of the stored data.

5. An electronic musical instrument as defined in claim 1, which further includes execution means for executing a process corresponding to the therefor operation mode.

6. An electronic musical instrument as defined in claim 1, which further includes plural control switches, and in which an operation mode of each of the control switches is set in accordance with the operation mode automatically set by said operation mode setting means, so that the data of the external memory medium is utilized in accordance with operation of the control switches.

7. An electronic musical instrument as defined in claim 1, in which the external memory medium is a floppy disk.

8. An electronic musical instrument as defined in claim 1, in which the external memory medium is an IC card.

9. An electronic musical instrument as defined in claim 1, in which the external memory medium is a CD-ROM.

10. An electronic musical instrument as defined in claim 1, which further includes display means for making a display corresponding to the determined operation mode.

11. An electronic musical instrument operable in plural operation modes each corresponding to respective data stored in plural external memory media, comprising:

plural external memory media each of which is removable and which stores data;

attaching means for attaching an external memory medium from among said plural external memory media to said electronic musical instrument;

reading means for reading out said data stored in the attached external memory medium;

operation mode determining means for determining one operation mode from among said plural operation modes based on the data read out from the attached external memory medium; and execution means for executing a function corresponding to the determined operation mode by utilizing the data read out by said reading means.

12. An electronic musical instrument as defined in claim 11, in which each said external memory medium has operation mode information representing the operation mode corresponding thereto, and said operation mode determining means determines the operation mode based on the operation mode information.

13. An electronic musical instrument as defined in claim 12, in which each said external memory medium has the operation mode information as part of the data stored therein.

14. An electronic musical instrument as defined in claim 11, in which the external memory medium is a floppy disk.

15. An electronic musical instrument as defined in claim 11, in which the external memory medium is an IC card.

16. An electronic musical instrument as defined in claim 11, in which the external memory medium is a CD-ROM.

17. An electronic musical instrument as defined in claim 11, which further includes display means for making a display corresponding to the determined operation mode.

* * * * *